United States Patent [19]

Krall

[11] Patent Number: 4,787,833

[45] Date of Patent: Nov. 29, 1988

[54] APPARATUS FOR APPLYING LABELS TO BLOW MOLDED ARTICLES

[75] Inventor: Thomas J. Krall, Toledo, Ohio

[73] Assignee: Owens-Illinois Plastic Products Inc., Toledo, Ohio

[21] Appl. No.: 80,372

[22] Filed: Jul. 31, 1987

[51] Int. Cl.⁴ .............................................. B29C 49/24
[52] U.S. Cl. .................................. 425/126.1; 425/503; 425/504; 425/522
[58] Field of Search .................. 425/503, 504, 126 R, 425/126.1, 522, 501, 502

[56] References Cited

U.S. PATENT DOCUMENTS

| | | | |
|---|---|---|---|
| 3,684,418 | 8/1972 | Langecker | 425/126 R |
| 4,636,166 | 1/1987 | Franks et al. | 425/503 |
| 4,679,997 | 7/1987 | Plenzler et al. | 425/126 R |
| 4,680,000 | 7/1987 | Nowicki et al. | 425/504 |

*Primary Examiner*—Willard Hoag

[57] ABSTRACT

In the making of a hollow plastic articles wherein a label is positioned in each of a plurality of spaced partible molds in a predetermined array, a preform is positioned in each set of partible molds and the molds are closed and the preform is blown outwardly to the confines of the mold to apply the label to the resultant hollow plastic article, the apparatus for indexing an endless conveyor in precise increments for receiving longitudinally spaced labels providing an array of labels which are thereafter simultaneously removed from the endless conveyor and delivered between the open partible molds which comprises a fixed conveyor gripper in a first position, a second conveyor gripper mounted for movement longitudinally of the belt and means for individually controlling the gripping of the first gripper and second gripper such that the second gripper can be actuated to engage the conveyor while the first gripper is disengaged and the second gripper can be moved longitudinally to thereby move the conveyor a predetermined distance, the first gripper can then be engaged with the conveyor and the second gripper released and returned to its original position for moving the conveyor in successive and predetermined increments for precise positioning of successive labels on the conveyor.

3 Claims, 10 Drawing Sheets

APPARATUS FOR APPLYING LABELS TO BLOW MOLDED ARTICLES

This invention relates to the application of labels to hollow blown plastic articles.

BACKGROUND AND SUMMARY OF THE INVENTION

In the making of hollow blown plastic articles such as containers, it has heretofore been suggested that labels be held in one or more of the mold sections by vacuum so that when the parison is blown outwardly into conformity with the cavity, the label becomes adhered or bonded to the article.

The molds are often provided in a plurality of sets of partible molds in a predetermined array and, in order to delivery the labels, a plurality of magazines are provided, one for each mold half, and an associated plurality of pick-up and delivery devices function to remove labels from the magazines and deliver them to one or both of the mold halves of each set.

As set forth in U.S. Pat. No. 4,636,166, having a common assignee with the present application, an apparatus is provided wherein labels are successively removed from a label magazine and positioned in an array which corresponds in spacing to the spacing of the sets of molds. The labels are then simultaneously moved in the array from the first position to a second position within the open partible molds and deposited in the molds. The apparatus comprises a magazine for supporting labels in a stack and an endless belt transfer device positioned adjacent the magazine. The belt is indexed in predetermined spaces corresponding to the spaces of the array of molds. A label pick-up device removes a label from the magazine and deposits it on the conveyor so that the spacing between the labels on the endless transfer conveyor corresponds to the spacing between the sets of molds. Another label deposit device removes the labels simultaneously from the endless transfer conveyor and delivers them between the open partible molds.

In my copending application Ser. No. 054,928, filed May 28, 1987, having a common assignee with the present application, a method and apparatus is disclosed which comprises providing labels on a roll of labels, successively engaging the free end of the web of the roll of labels by a first endless vacuum conveyor, tensioning the portion of the web between a point upstream and the free end by the first endless vacuum conveyor, successively cutting a label on the free end from the remaining tensioned portion, transferring each label successively by moving the first endless conveyor adjacent a second endless vacuum conveyor which is transverse to the first conveyor, indexing the second endless conveyor to provide an array of labels on the second endless conveyor which corresponds in spacing to the spacing of the array of molds, engaging the array of labels and moving them from a first position adjacent said second conveyor to a second position within the partible molds and depositing the labels in the molds.

Where an endless conveyor belt is utilized to receive the labels and position them in the predetermined array for delivery to the open partible molds, a problem occurs because of the slippage between the endless conveyor and the roller. More specifically, when the drive roller is rotated, the belt is driven through friction between the roller and the belt. The distance or amount that the belt is moved depends on the amount of slippage between the belt and roller as well as the pitch diameter of the belt and roller as the belt feeds over the roller. Even if the slippage is eliminated, changes in the extent of movement of the belt occur as the pitch diameter changes. These changes in pitch diameter occur because changes in belt flexibility occur especially where the endless belt is spliced from a length of belt.

Among the objectives of the present invention are to provide an apparatus for applying labels to blow molded articles which utilizes an endless conveyor wherein the movement of the belt is independent of changes in pitch diameter; wherein slippage is controlled; and wherein the conveyor is moved in precise predetermined increments obviating any cumulative air of movement in providing an array of labels.

In accordance with the invention, the apparatus for indexing an endless conveyor in precise increments for receiving longitudinally spaced labels providing an array of labels which are thereafter simultaneously removed from the endless conveyor and delivered between the open partible molds comprises a fixed conveyor gripper in a first position, a second conveyor gripper mounted for movement longitudinally of the belt and means for individually controlling the gripping of the first and second grippers such that the first gripper can be actuated to engage the conveyor and moved longitudinally to thereby move the conveyor a predetermined distance, the first gripper can then be engaged with the conveyor and the second gripper released and returned to its original position for moving the conveyor in successive and predetermined increments for precise positioning of the labels on the conveyor.

DESCRIPTION

Figure 1:
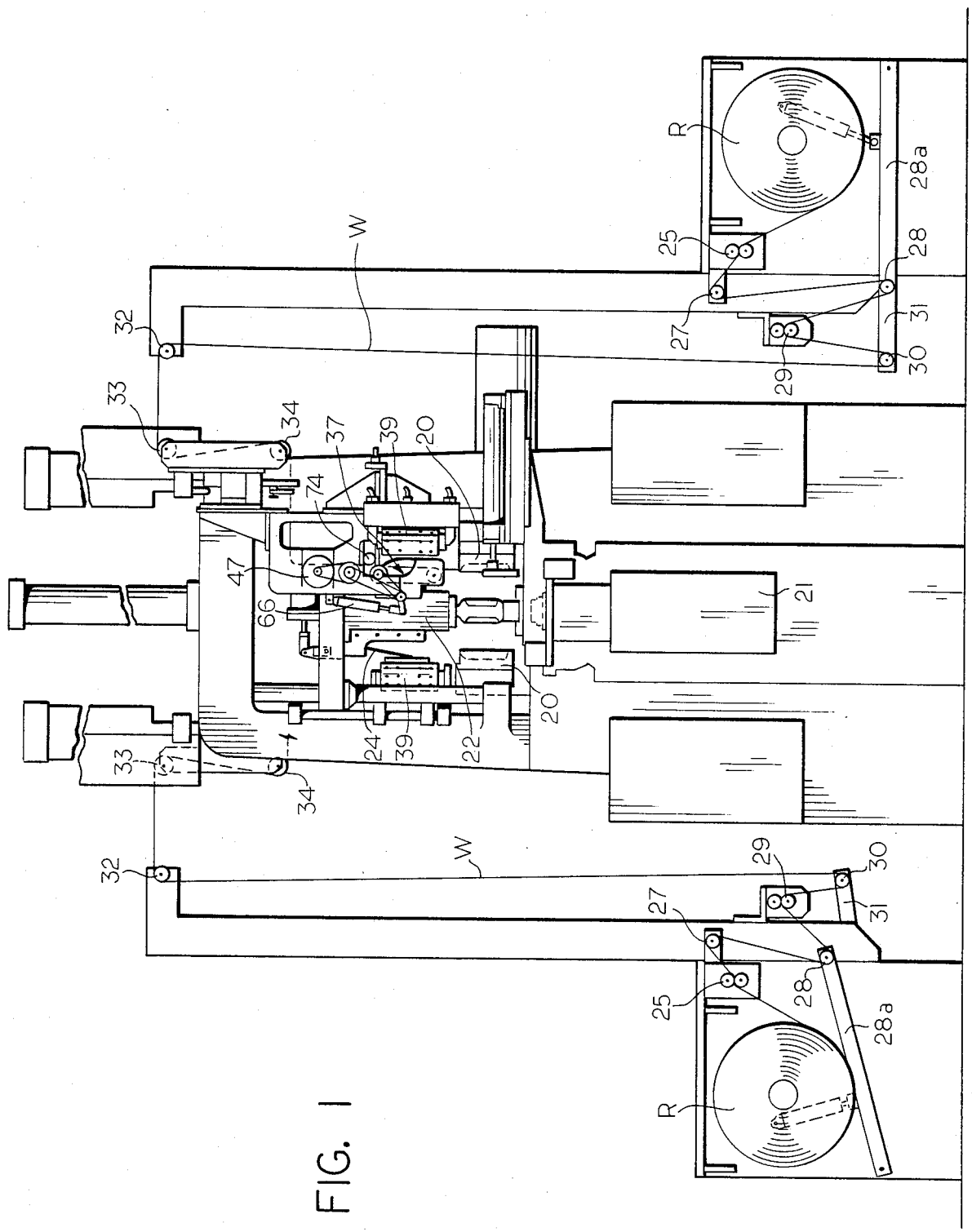
FIG. 1 is a side elevational view of a blow molding apparatus embodying the invention.
Figure 2:
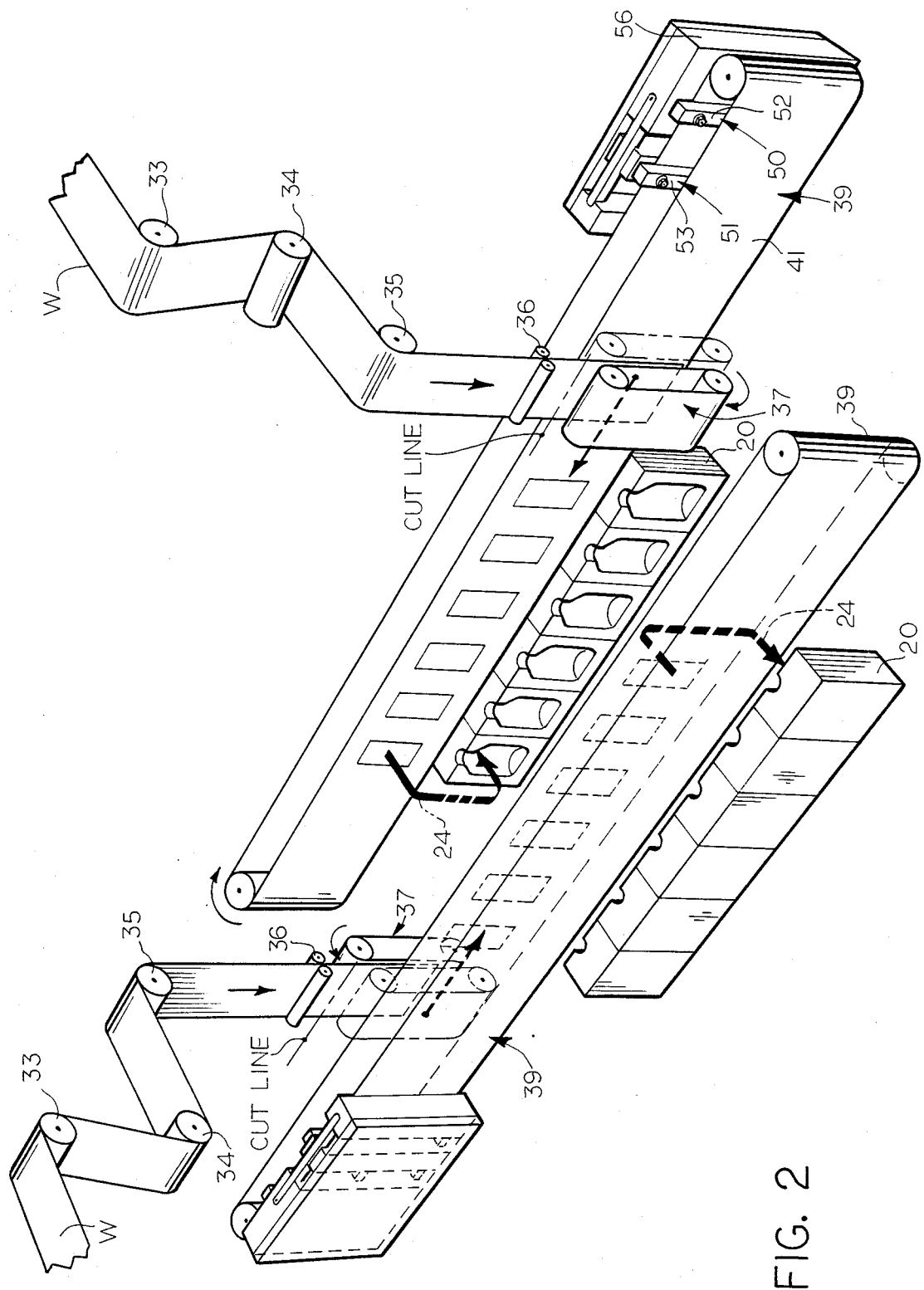
FIG. 2 is a fragmentary perspective schematic view embodying the apparatus.
Figure 3:
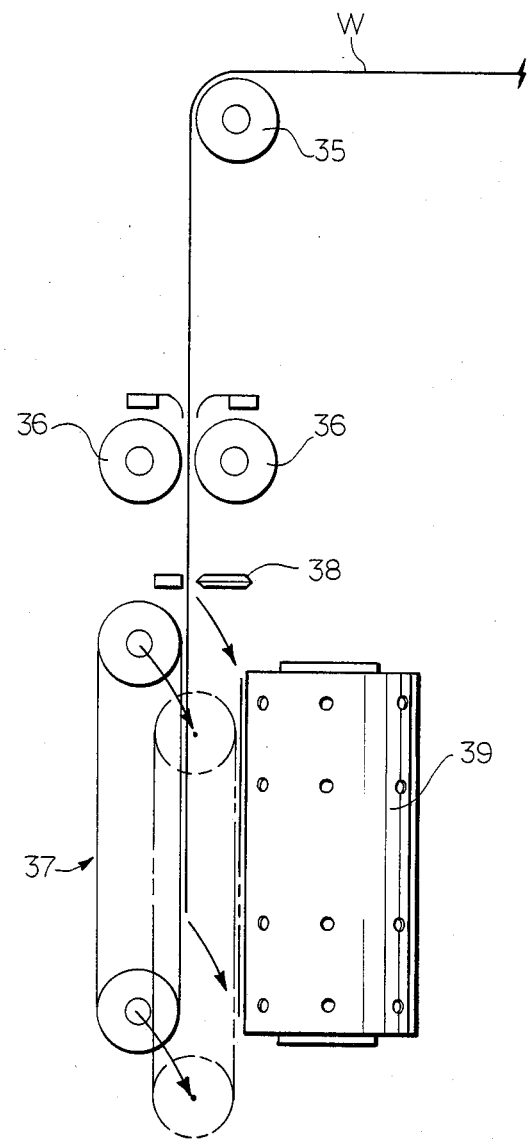
FIG. 3 is a fragmentary elevational schematic of a portion of the apparatus.
Figure 4:
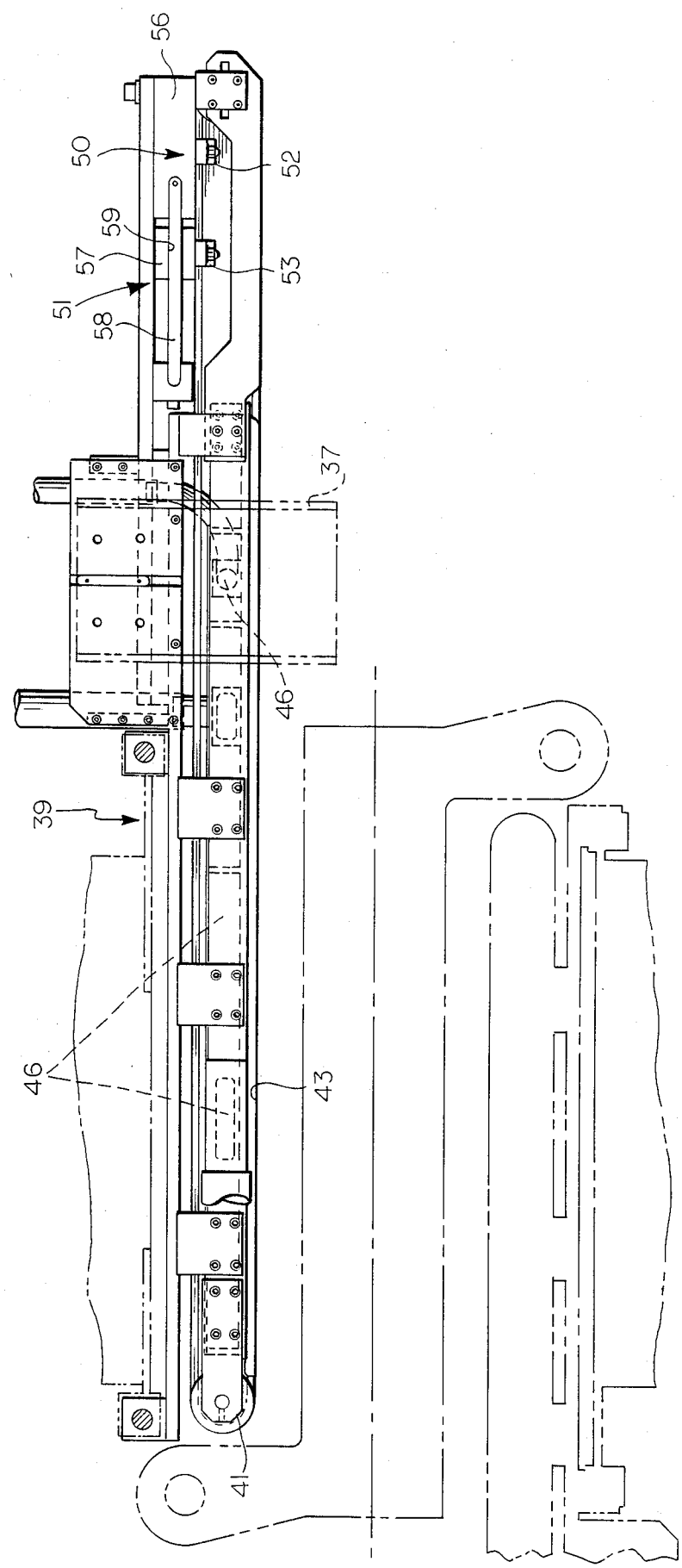
FIG. 4 is a fragmentary plan view of the endless conveyor utilized in the apparatus shown in FIGS. 1–3.
Figure 5:
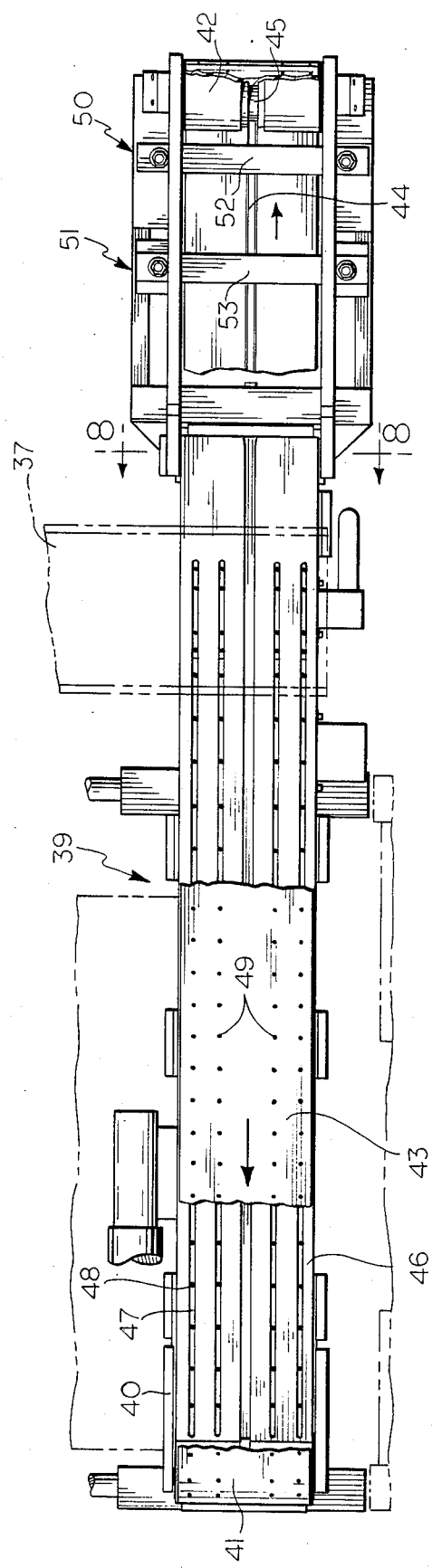
FIG. 5 is a fragmentary front elevational view of the conveyor shown in FIG. 4.
Figure 6:
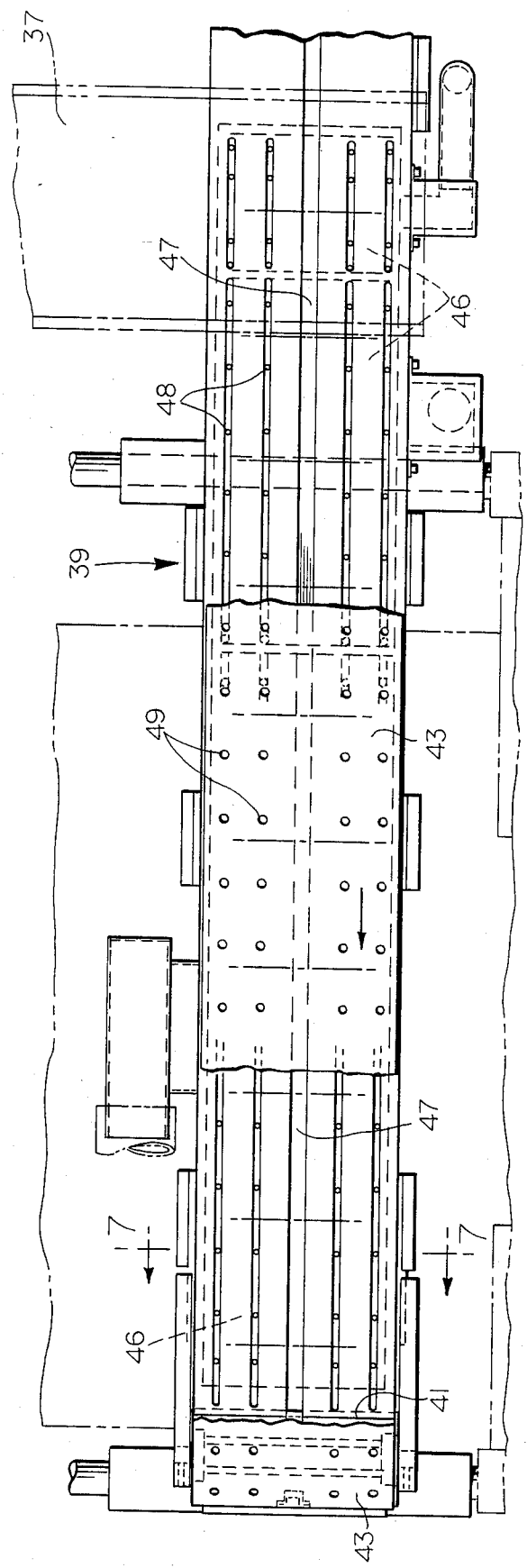
FIG. 6 is a fragmentary front elevational view on an enlarged scale.
Figure 8:
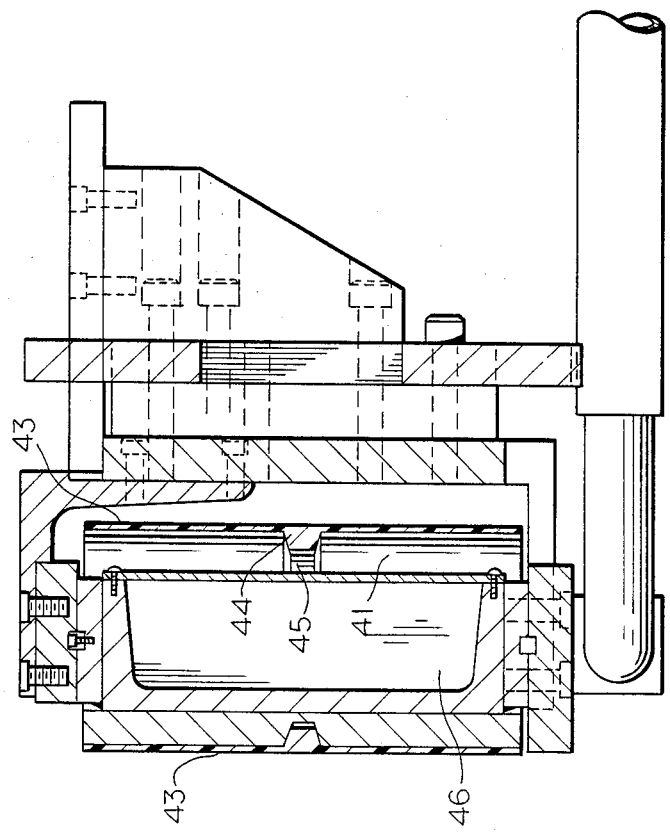
FIG. 8 is a fragmentary sectional view taken along the line 8—8 in view FIG. 5.
Figure 7:
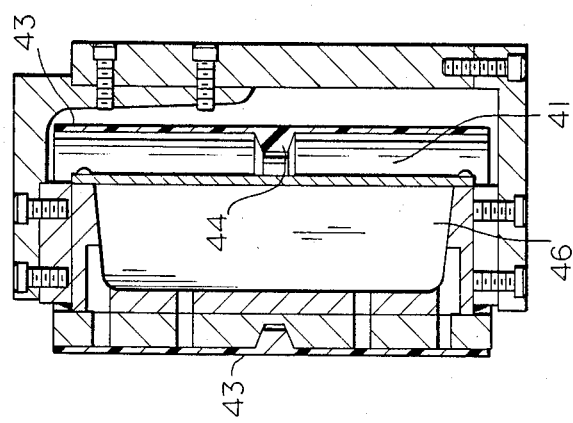
FIG. 7 is a sectional view taken along the line 7—7 in FIG. 6.

Referring to FIGS. 1 and 2, the invention relates to blow molded plastic articles such as containers wherein labels are applied to sections of a set of molds and the mold sections are closed and a heated parison or preform is blown outwardly into conformity with the mold sections causing the labels to be adhered or bonded to the blown articles.

In one type of apparatus to which the invention relates, the apparatus includes a plurality of sets of partible molds 20 in a linear array, that is, in side-by-side relationship. An extruder 21 is associated with each set of molds and a head 22 is moved downwardly to receive the end of an extruded tube in a neck mold in the head which is then drawn upwardly to position a preform or parison between the mold sections 20. The mold sections are then closed and the article blown to the desired configuration within the confines of the mold. Where a label is to be applied, the head 22 supports label deposit devices 24 as hereinafter described which deliver labels to the mold sections. If only one label is to be applied, a single deposit device 24 is provided for each set of molds.

Labels are provided on the webs W of a roll R of label material such as plastic or paper on each side of the machine. The end of each web W is trained between a first set of driven rollers 25 over an idler roller 27 and then under a roller 28 on a pneumatically operated dancer arm 28a and then between a second set of driven pinch rollers 29 and then under an idler roller 30 on a dancer arm 31. The web W passes from idler roller 30 upwardly over an idler roller 32 and horizontally over an idler roller 33, vertically to an idler roller 34 and then horizontally to an idler roller 35 and then downwardly between driven pinch rollers 36, on each side of the machine. The free end of the web W is then engaged by an endless vacuum conveyor 37 which applies tension on the portion of the web between the driven rollers 36 and the conveyor 37. A knife assembly 38 can be actuated to sever the label from the portion under tension. The endless conveyor 37 then continues to operate until the label is centered on the endless conveyor 37. Thereafter, the endless conveyor 37 is moved bodily to bring the label adjacent an endless vacuum transfer conveyor 39 that extends horizontally. Endless transfer conveyor 38 is indexed horizontally relative to its respective conveyor 37. Successive labels are similarly severed and delivered to the conveyor 39 to provide an array of labels on the conveyor 39 corresponding to the number of cavities defined by mold sections 20 of the blow molding machine. Thereafter, the label deposit devices 24 function to remove the labels from the conveyor 39 and deposit them in the respective cavities of the mold sections 20. The endless conveyor 37 is driven intermittently by a motor M such as a stepping motor.

The aformentioned apparatus is disclosed and claimed in the aforementioned application Ser. No. 054,928, filed May 28, 1987, which is incorporated herein by reference.

The present invention is directed to the endless conveyor 39 and particularly to a construction which will insure that the conveyor will receive labels and hold them in a predetermined precise array for subsequent delivery to the vacuum delivery devices 24. Referring to FIGS. 4-11, the endless conveyor 39 comprises a frame 40 on the ends of which idler rollers 41, 42 are rotatably mounted. An endless belt 43 is trained over the idler rollers. Endless belt 43 includes a longitudinally extending rib 44 on the inner surface thereof which is received in grooves 45 in the idler rollers 41, 42. The frame 40 further supports one or more vacuum chambers 46 which have longitudinally extending ribs 47 and openings 48 to provide a vacuum to the belt. The belt, in turn, is provided with openings 49 so that when a label is delivered to the belt, it is held on the belt. As shown in broken lines in FIGS. 5 and 6, the delivery device for delivering labels to the endless conveyor 39, heretofore described as the endless conveyor 37, delivers the labels successively to one end of the conveyor.

Referring to FIGS. 4, 5, 9 and 10, the means for moving the endless belt in precise increments comprises a first mechanical gripper 50 which is adapted to grip the belt and a second mechanical gripper 51 which is also adapted to grip the belt but also move longitudinally in order to move the belt a precise distance. In a cycle of movement, the second gripper 51 engages the belt while the first gripper 50 is disengaged and moves the belt longitudinally a predetermined distance. The second gripper 50 is then engaged with the belt and the first gripper 51 is disengaged and returned to its original position. In this manner, the belt is moved a predetermined distance and maintained in this position until a new cycle begins when the second gripper 51 is engaged with the conveyor, the first gripper is released, and the second gripper 51 is moved longitudinally through a second increment.

Each of the grippers comprises a transverse bar 52, 53 and each bar 52, 53 has associated therewith an air cylinder 54, 55 at each end. The cylinders 54 associated with the gripper 50 are mounted in fixed position on a block 56 while the cylinders 55 associated with the gripper 51 are mounted on a sliding block 57 that is guided for movement lengthwise of the conveyor by spaced bars 58 engaging respective grooves 59 in the end of the slideable block 57.

Figure 10:
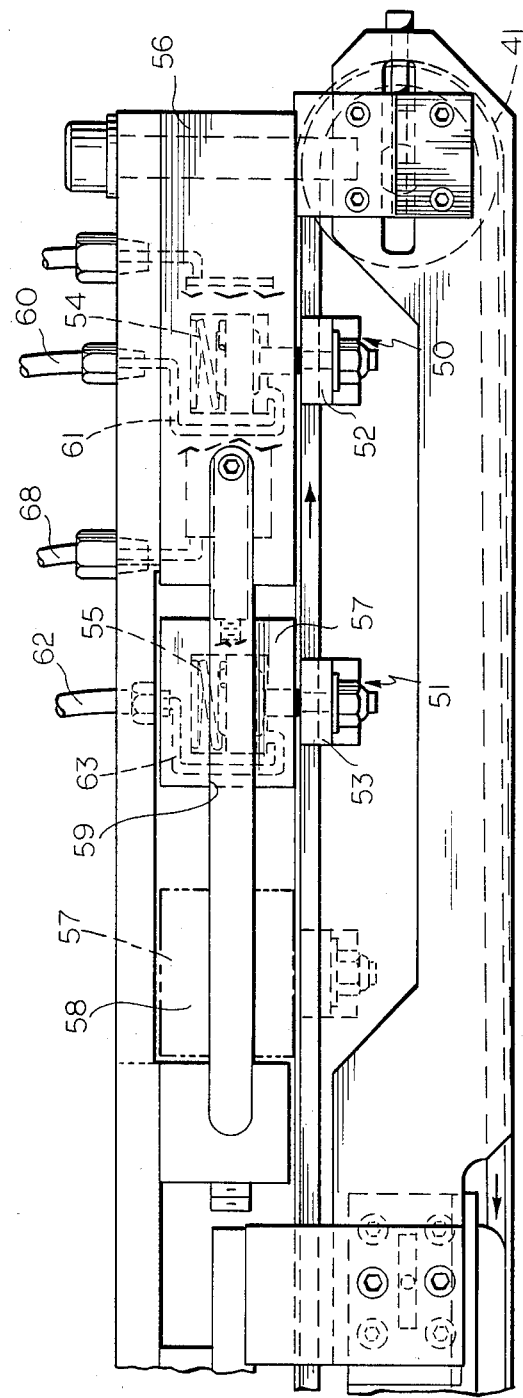
FIG. 10 is a fragmentary plan view of a portion of the apparatus shown in FIG. 9.
Figure 11:
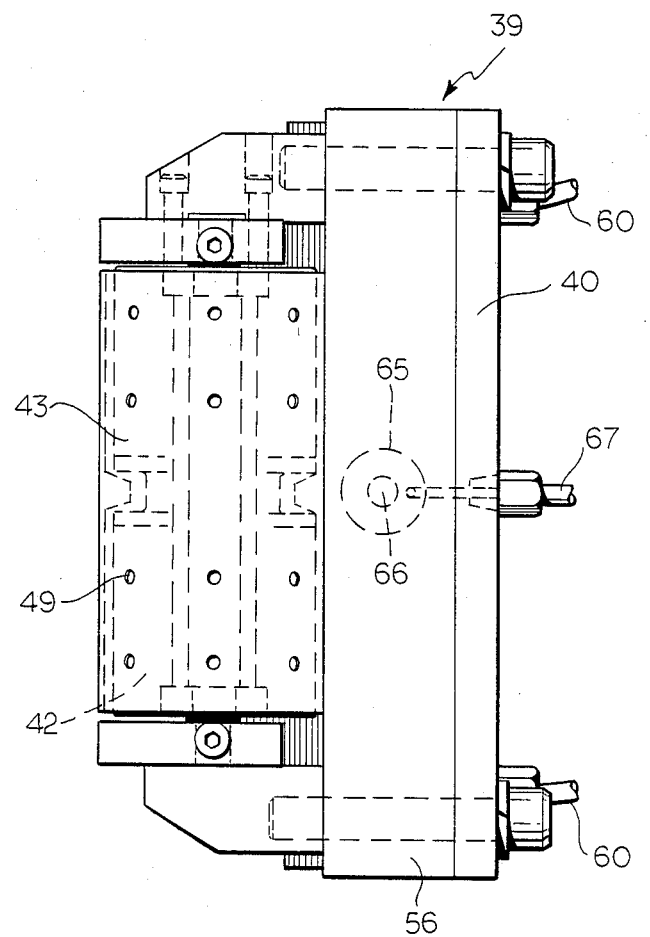
FIG. 11 is an end view of the apparatus shown in FIGS. 9 and 10 taken from the right.

Referring to FIGS. 10 and 11, fluid lines are provided for pneumatically controlling the respective motors. As shown, the motors have pistons which are spring-loaded to normally move the gripping bars 52, 53 and hold them out of engagement with the belt. When air is applied to the motors, the bars 52, 53 are moved to engage the belt in the desired cycle. As shown in FIG. 10, a line 60 extends to a passage 61 in block 56 to the underside of the piston of the motors 54. A line 62 similarly provides air to the passage 63 for actuating the motors 55.

Figure 9:
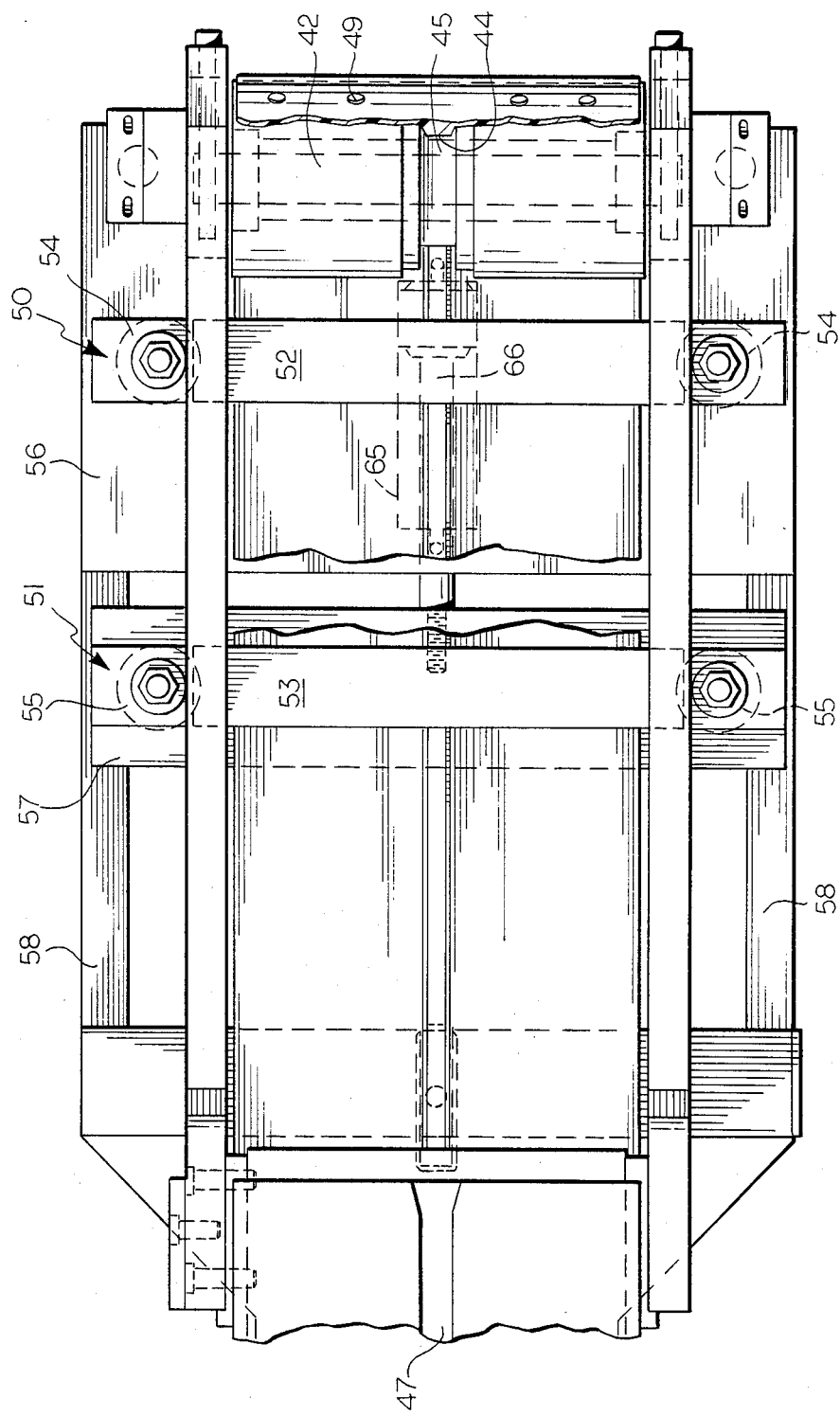
FIG. 9 is a fragmentary elevational view on an enlarged scale of a portion of the apparatus shown in FIG. 5.

The apparatus for moving the slideable block 57 comprises a cylinder 65 that has a piston 66 connected to the slideable block 57 (FIG. 9). Fluid is supplied to the openings U and V by lines 67, 68 to actuate the piston and move the block back and forth.

The aforementioned and above described apparatus for moving the belt is preferably positioned near one end of the conveyor along the reach of the belt 41 opposite to the reach to which the labels are being delivered and such as to pull the reach to which the labels are being delivered past the delivery conveyor 37.

It has been found that the in-mold labeling apparatus utilizing the conveyor system moves the belt independently of changes in pitch diameter and slippage and provides for precise predetermined array of labels so that the labels can be accurately delivered to an array of the molds.

I claim:

1. In an apparatus for making a hollow plastic articles wherein a label is positioned in each of a plurality of spaced partible molds in a predetermined array, a preform is positioned in each set of partible molds and the molds are closed and the preform is blown outwardly to the confines of the mold to apply the label to the resultant hollow plastic article, and an apparatus for receiving an array of longitudinally spaced labels, the improvement comprising an apparatus for indexing an endless conveyor in precise increments for receiving longitudinally spaced labels providing an array of labels which are thereafter simultaneously removed from the endless conveyor and delivered between the open partible molds, said indexing apparatus comprising a fixed conveyor gripper in a first position, a second conveyor gripper mounted for movement longitudinally of the conveyor and means for individually controlling the gripping of the first and second grippers such that the second gripper can be actuated to engage the conveyor while the first gripper is disengaged and said second gripper can be moved longitudinally to thereby move the conveyor a predetermined distance, the first gripper can then be engaged with the conveyor and the second gripper released and returned to its original position for moving the conveyor in successive and predetermined increments for precise positioning of the labels on the conveyor.

2. The apparatus set forth in claim 1 wherein each said gripper comprises a transverse bar, a cylinder associated with each said transverse bar, the first gripper being fixed on one of said bars, the second gripper being mounted on a slideable block, and means for reciprocating said slideable block, and means for supplying fluids selectively to said cylinders for actuating them to move the respective bar into and out of engagement with the belt.

3. The apparatus set forth in claim 1 wherein said grippers are positioned along a reach of the belt opposite to the reach to which the labels are being delivered and in a position such that the length of belt to which the labels are being delivered is pulled past the position to which labels are being delivered to the belt.

* * * * *